G. R. WOOD.
COMPUTING MACHINE.
APPLICATION FILED APR. 20, 1916.
1,376,850.
Patented May 3, 1921.
3 SHEETS—SHEET 1.
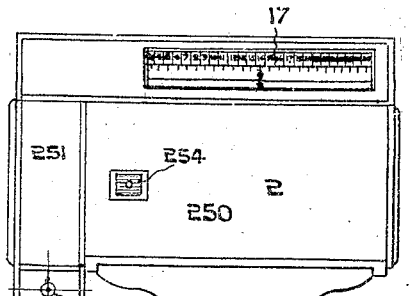
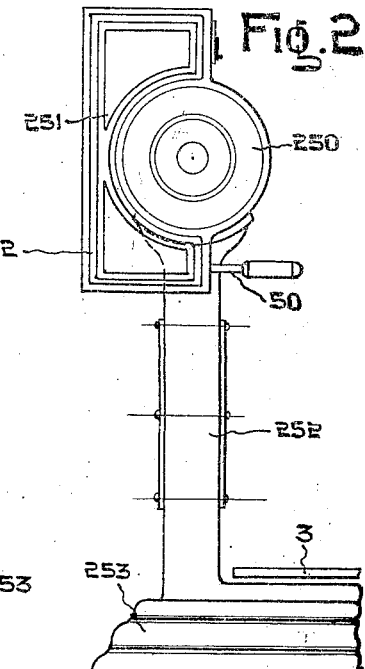
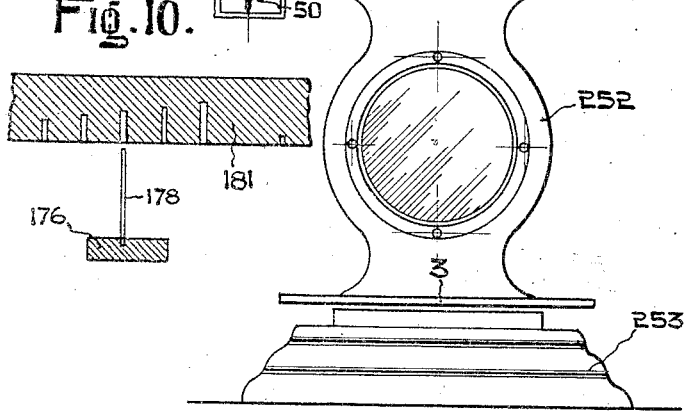
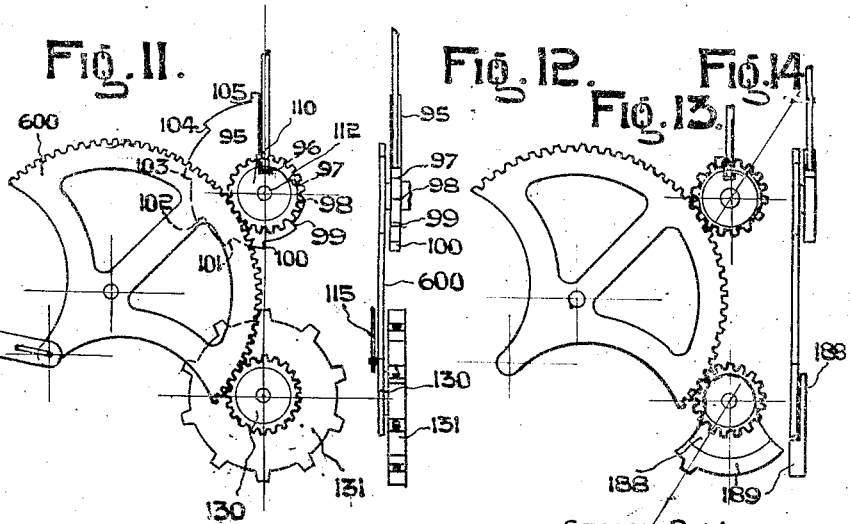
GEORGE R. WOOD
INVENTOR
WITNESSES:
PER ATTORNEY

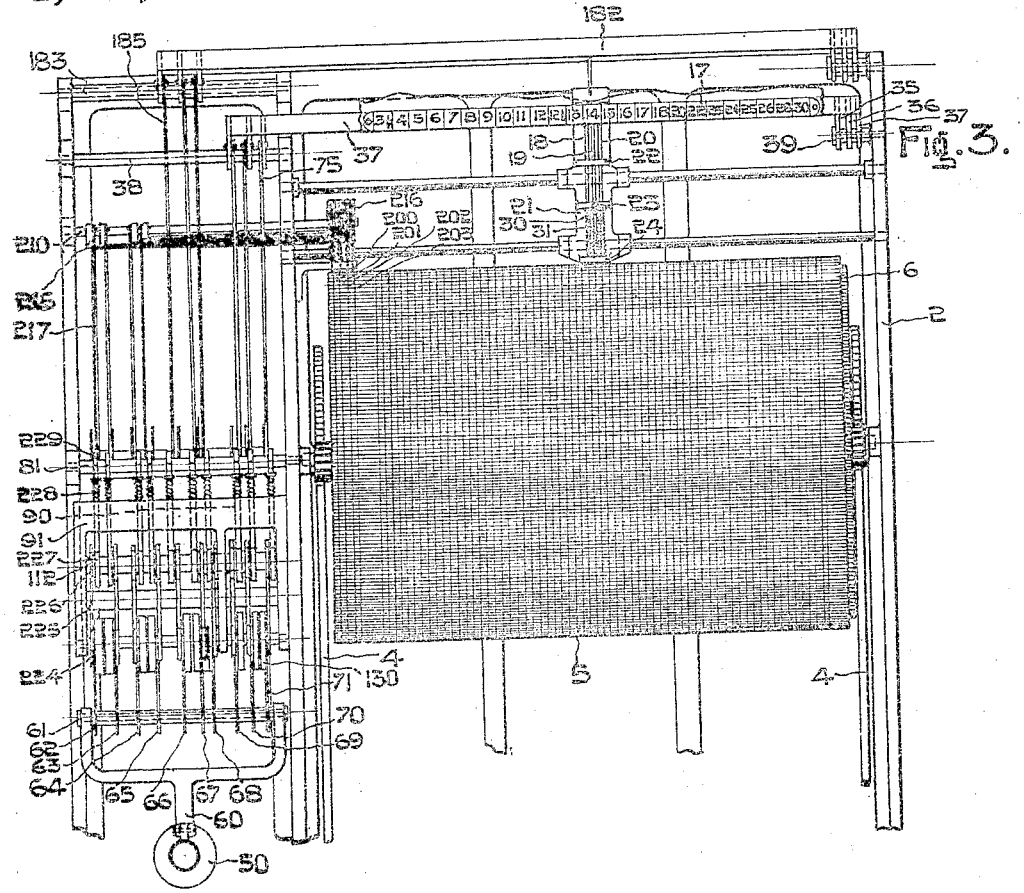

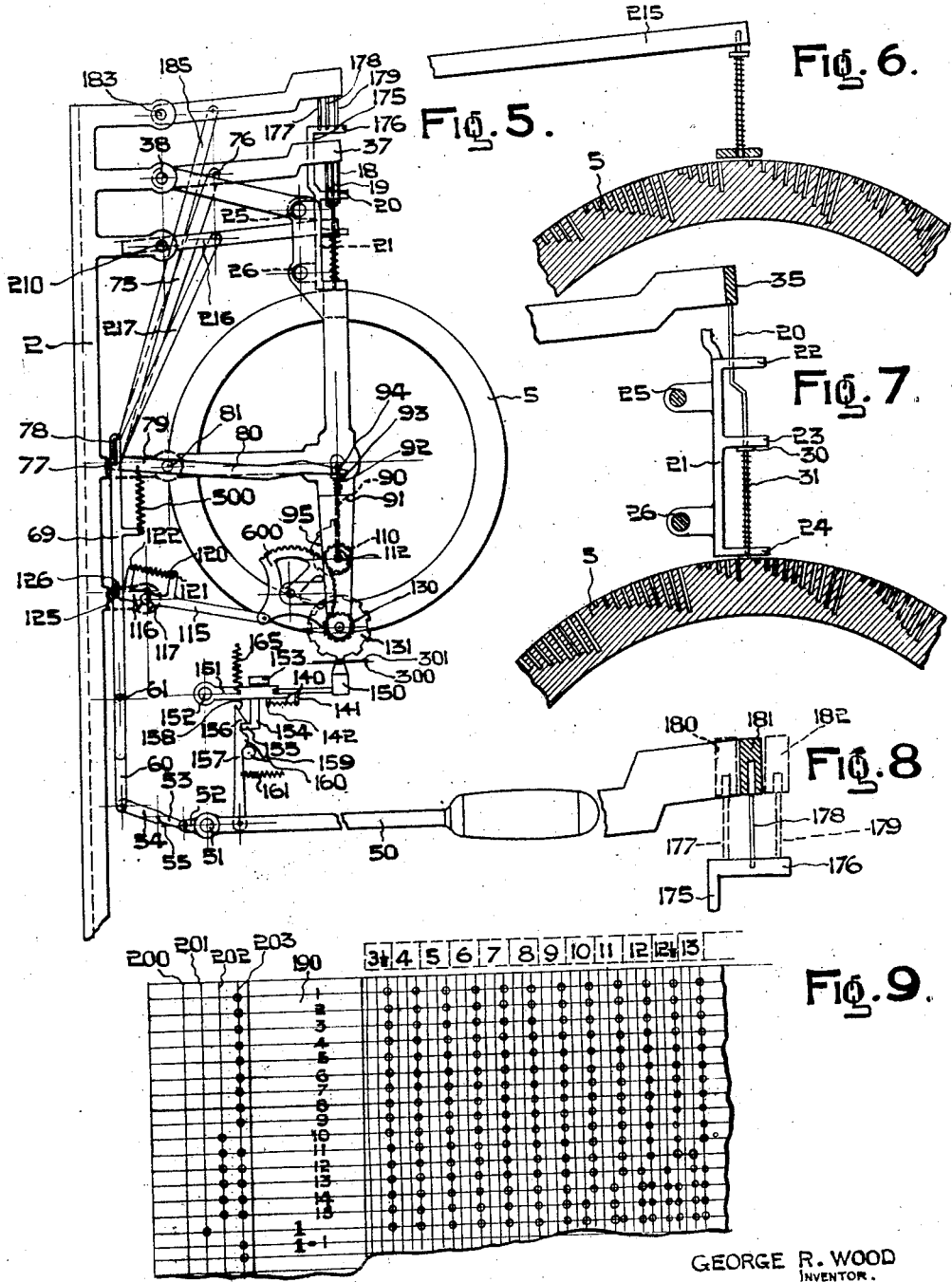

UNITED STATES PATENT OFFICE.

GEORGE R. WOOD, OF MONTREAL, QUEBEC, CANADA, ASSIGNOR OF ONE-HALF TO WILLIAM A. WOOD, SR., OF MONTREAL, QUEBEC, CANADA.

COMPUTING-MACHINE.

1,376,850.　　　Specification of Letters Patent.　　Patented May 3, 1921.

Application filed April 20, 1916. Serial No. 92,522.

*To all whom it may concern:*

Be it known that I, GEORGE R. WOOD, of the city of Montreal, Province of Quebec, Dominion of Canada, have invented certain new and useful Improvements in Computing-Machines, of which the following is a full, clear, and exact description of the same.

My invention has for its object to provide a comparatively simple and easily operated machine by which the sum of a known quantity and a given value per unit of the quantity may be computed and recorded; and to afford means of this nature applicable to a merchandise scale whereby a ticket or bill may be issued to the purchaser of each specifically weighed quantity, which will give irrefutable information of the weight of the merchandise purchased, the rate per unit of quantity and the total price thereof.

To this end the invention may be said, broadly, to consist of a movable unitary indicating computing member having a divided and subdivided surface containing in its divisions and subdivisions respectively separated devices representing the units of quantity and fractions of units of quantity the value of which are computable, and units of value and fractions of units of value predetermined to have a range sufficient to cover the scope of the quantity indications. Disposed in fixed position relatively to this member are printing mechanisms, and intermediate mechanisms adapted to effect operative connections therebetween and the quantity and value indicating devices; controlling and locking mechanisms automatically co-acting with the printing mechanisms to present the results of the computations; and manually operated means for operating the intermediate mechanisms.

More specifically stated, when applied to a computing scale, the movable indicating computing member is in the form of the well known balanced cylinder rotated by the platform of the scale to automatically cause one of a circumferential series of circumferentially spaced lines in its perimeter and parallel to its axis and arranged in certain predetermined angular positions on the perimeter and in certain relation with depressed positions of the platform, to assume a position in juxtaposition with a graduate scale of rates or prices carried by the frame of the machine in fixed position relatively to the cylinder. According to my invention the surface of the cylinder is unbroken except for a series of circumferentially and axially spaced distinct and separate sockets or borings, the sockets or borings of each group being of different depths while the groups are circumferentially arranged and each depth has a certain specific value as to quantity or price; and certain portions of the perimeter of the cylinder represent the ordinal "zero." A series of rockers corresponding in number to the groups of sockets or borings of each series are in operative relation with certain pins in a series and are arranged in parallelism with the axis of the cylinder. These rockers constitute an operative intermediary between a manually operated device and the pins, whereby the pins are inserted into the sockets or borings or caused to bear upon the perimeter of the cylinder between the sockets, and consequently thereby adapting the sockets or borings to control the printing mechanism. A carrier for the pins immovable radially relatively to the indicating member and movable parallel to the surface or perimeter thereof, enables the operator to shift the pins to registering position with any particular series of price sockets or borings.

These distinct and separate sockets or borings which with isolated adjacent portions of the perimeter of the movable member forming the groups of value or weight indicating device and the pins and sockets, or their equivalents, and the separately carried controlling and printing mechanisms, are the spirit and essence of my invention.

For full comprehension, however, of my invention, reference must be had to the accompanying drawings forming a part of this specification in which similar reference characters indicate the same parts, and wherein:

Figure 1 is a front elevation of a cylinder scale equipped with my invention;

Fig. 2 is a side elevation thereof;

Fig. 3 is a front elevation of my improved combination of parts removed;

Fig. 4 is a plan view thereof;

Fig. 5 is an end elevation thereof;

Fig. 6 is a sectional view of a fragment of the cylinder illustrating particularly the sockets representing the different weights;

Fig. 7 is a similar view to Fig. 6 illustrating the sockets for producing the computation of values;

Fig. 8 is a sectional view of the rocker-bar illustrating particularly the rate producing sockets;

Fig. 9 is a fragmentary elevation of the cylinder in diagram;

Fig. 10 is a side elevation of one of the rate producing rockers;

Fig. 11 is a side elevation of the mechanism for operating the print wheels;

Fig. 12 is a front elevation thereof; and

Figs. 13 and 14 are similar views to Figs. 11 and 12 illustrating the quadrantal print wheel.

The frame of the machine, indicated at 2, is made of any suitable design to meet the requirements of the particular type of scale or other machine to which the invention is applied. The platform of the scale is indicated at 3, the cylinder at 5 and the operative connection between the cylinder and the platform at 4. This operative connection may include any preferred balancing mechanism commonly used in connection with computing scales; and as the same does not form any part of my present invention I will not describe it in detail. The sole element essential to the correct operation of my invention being the star wheel, 6, mounted on the end of the cylinder.

The scale indicated is designed to compute pounds and ounces with the prices per pound: 3½, 4, 5, 6, 7, 8, 9, 10, 11, 12, 12½, 13, 14, 15, 16, 17, 18, 20, 22, 23, 24, 25, 26, 27 and 30, the capacity of the scale being sixteen pounds. With a scale of this capacity the star wheel must have a notch for each ounce and consequently two hundred and fifty-six notches and points. A suitable locking device indicated at 10 is adapted to set the cylinder in true position after it has come to its balance. All of these parts, with the exception of the drum, and the drum itself in the main, are of well known construction and arrangement commonly used in the computing scales on the market.

The cylinder, according to my invention, is divided by seventy-five circumferential lines, to represent twenty-five series of three groups each corresponding with each of the prices or rates; and is further divided by four circumferential lines representing pounds and ounces. The cylinder is further divided by two hundred and fifty-six longitudinal parallel lines in parallelism with the axis of the cylinder. The star wheel is set with the notches between the points coinciding with the ends of the lines 16.

The points of intersection of these axial and circumferential lines represent values in the case of dollars and cents and quantities in the case of pounds and ounces, and in order to adapt the cylinder to indicate the weight of the merchandise thrown upon the scale and the value of it in dollars and cents I bore the cylinder to provide sockets at all the points of intersection excepting those points of intersection representing zero, these points are flush spaces on the surface of the cylinder. These sockets are graduated in depth, all those of the same value being equal and of a different depth from the others of the group. There are three of these groups to each series and a series for each price, all sockets of a certain value being the same depth throughout the surface of the cylinder.

The inner end of each boring constitutes an abutment which limits movement of the pin within the same while the sides of the opening presented by the opposite end of the boring act as a guide for the pin during movement, thereby insuring correct computations.

The prices or rate per pound are inscribed on a horizontal strip, 17, disposed parallel to the cylinder and preferably a short distance above it, each price being placed in a space equal to the width taken up by one series of sockets or borings.

A series of three horizontally and vertically movable pins, 18—19 and 20 are carried in the vertical plane of the axis of the cylinder and are of a diameter to readily enter the socket and are correspondingly spaced to the groups of each series of sockets or borings. The carrier for these pins consists of a vertical plate, 21, having three flanges 22, 23, and 24 on its front near the top, middle and bottom, and two series of rearwardly extending lugs 25 and 26. These pins are slidably mounted in the flanges of the carrier and each is independently yieldingly supported by a collar 30 mounted rigidly thereon and a helical spring 31 bearing between the collar and the lowermost flange 24. Each of these pins is adapted to be pushed downwardly into the sockets by one of a series of three nested U-form rockers 35, 36 and 37 pivoted on a pair of shafts 38 and 39 mounted rigidly in the frame of the machine, the upper ends of the pins being arranged in an oblique horizontal plane relatively to the rockers to locate each pin under its respective rocker, the pin on the left (looking toward the front of the machine) and the pin on the right being angularly offset in relatively opposite directions for the purpose (see Fig. 7).

These rockers 35, 36 and 37 are of sufficient length to extend from end to end of the cylinder and are located with their longitudinal portions directly above and in position to bear upon the respective pins. The rockers are connected with the different printing mechanisms which include print wheels, means operatively connecting the rockers to the print wheels, controlling and locking mechanisms, and a manually operated part, with means connecting the same to the print wheel operating mechanism to operate them successively. There are also ribbon feeding and reversing mechanism, and paper feeding and cutting mechanism which may be of a form found in cash registers at present on the market and other similar machines having paper strip printing, feeding and cutting mechanisms, and as these form no part of my invention they are indicated for illustrative purposes only.

An operating lever 50 is fulcrumed on a shaft 51 carried in the frame of the machine, and has a tail 52 pivoted to a tail 53 of a second lever 54 fulcrumed upon the shaft 55 and pivotally connected to the lower end of a yoke 60 connected at its upper end to the cross bar 61 to which are pivotally connected the lower ends of ten independent and distinct pull bars 62, 63, 64, 65, 66, 67, 68, 69, 70 and 71 operating the various rockers and pins of the machine. These mechanisms are divided into three sets, one set for the pins 18, 19 and 20 and the other two sets for other pins to be presently described.

Referring first to the pins 18, 19 and 20 and the rockers 35, 36 and 37, it should be understood that the mechanisms controlled by these pins and operated by the lever 50 are the same in all respects and only one need be described therefor. Taking pull bar 69 and rocker 37 as an example. T" bar is operatively connected at its upper end to the rocker and controlling and locking mechanism for the print wheels and approximately midway of its length to the print wheel operating mechanism. Means operatively connecting the bar to the rocker consists of a link 75 pivoted as at 76 a short distance inwardly from the pivot shaft 38 of the rocker and at its lower end to a pivoted pin 77 slidably engaging a slot 78 in the upper end of the bar. This pin 77 also has pivotally connected thereto the tail 79 of a lever 80 fulcrumed on the shaft 81 mounted in the frame of the machine. This tail is operatively connected to the pull bar 69 by a helical spring 500. In order to obtain the proper working of my machine, the distance between the points 38 and 76 must be equal to that between points 77 and 81 and the length of the side arms of rocker 37 and lever 80 must also correspond, this arrangement insuring a correspondence of movement between the forward ends of the rocker and lever. The lever operates a limiting pin 90 for limiting rotation of its respective print wheel, such pin being guided in a block 91 forming a part of the machine frame, and being yieldingly supported in bearing relation with the lever by a spring 92 bearing upon a collar 93 on the pin near its upper end 94 which projects through a slot in the nose of the lever, thus causing the pin to automatically follow the lever as it is raised and to be depressed as the lever returns to its normal position. This limiting pin engages a spiral lock 95 having a pinion 110 secured rigidly thereto, the member thus formed being rotatively mounted on a shaft 112 carried by the frame of the machine. The edge of the lock is divided into tenths represented by uniformly angularly spaced teeth 96, 97, 98, 99, 100, 101, 102, 103, 104 and 105 respectively, each tooth corresponding with one of the figures on the print wheel consequently when the pin is raised to an extent permitting rotation of the lock 95 two teeth the print wheel is then also free to rotate until the figure 2 comes opposite the printing point.

A sector rack 600 pivoted to the frame of the machine intermeshes with the pinion 110 and is operatively connected to pull-bar 69 by a lever consisting of two parts, 115 and 116, hinged together as at 117 with its hinge pin serving as a fulcrum for the lever, such hinge pin being supported in the frame and extending through the other corresponding mechanisms. These hinge lever parts are connected yieldingly together by a helical spring 120 secured at its opposite end to fingers 121 and 122 on the respective lever parts the tension of the spring being sufficient when the pull-bar 69 is pulled to raise part 115 until it is stopped by the engagement of the pin 90 with the spiral lock 95. With this arrangement different degrees of movement of the lever parts is accommodated the pivoted ends of the two parts being cut away to allow further movement of the part 116 if necessary after the part 115 has been stopped. The connection between the lever part 116 and the pull rod is a pin 125 working in a slot 126 which has for its purpose to delay the operation of this hinge lever until after the lever 80 has completed its movement. This detail description covers the mechanism for controlling and locking the print wheel of this particular rocker but does not operate it. The operation of this print wheel is effected by a pinion 130 corresponding to the pinion 110 and rigidly connected to the print wheel 131, the periphery of the latter being divided into tenths represented by printing type indicating respectively 1, 2, 3, 4, 5, 6, 7, 8, 9, 0, and this print wheel and its pinion being rotatively mounted in the portion of the machine frame in position to have the sector rack 600 intermesh therewith thereby securing the operation of this type wheel in unison and under the control of the controlling and locking means.

In connection with this print wheel is a printing mechanism to operate immediately after the print wheel has been adjusted and set. This printing mechanism consists of a hammer 150 carried by the end of a lever 151 pivoted on the shaft 152 preferably substantially in the same vertical plane as the shaft 51, the lever 151 being normally held in yielding contact with a stop 153 by a spring 165 connected at one end to the lever and at its opposite end to the frame of the machine. This lever has a downwardly extending arm 154 with a lateral finger 155 and the hammer is yieldingly held in alinement by a retractile spring 140 connected at its opposite ends to pins 141, 142, on the hammer and lever respectively. This finger 155 is adapted to be engaged by the hooked end 156 of a link 157 pivoted to the operating lever 50. The end of this link is beveled as at 158 and a short distance from its end is a cam 159 adapted to ride over a fixed pin 160; a retractile spring 161 connected at one end to the frame and at its opposite end of this link yieldingly retains the latter in bearing relation with the pin 160. With this arrangement of parts, when the manually operated lever is depressed the lever 151 is pulled down against the resistance of spring 165 until the cam 159 riding over fixed pin 160 displaces the hooked end of the link from the finger 155, thereby releasing the lever 151 which is returned sharply by the spring 165 into contact with the stop, the effect being that the hammer 150 is sprung upwardly and causes an impression to be made by the alined type of the various type wheels.

In order to print the rate at which any specific purchase of merchandise is sold, a series of rate rockers operate a series of rate print wheels by means of stationary pins carried by the carriage and adapted to enter sockets in these rate-rockers. These fixed pins are carried by an upwardly extending bracket 175 on the carriage and having a forwardly extending flange 176 in which the three pins 177, 178 and 179 are rigidly mounted. The rockers indicated at 180, 181 and 182 are also of U-form and pivoted on a shaft 183 carried in the frame of the machine in the same vertical plane with shaft 38. There are three of these rockers each located directly over the horizontal path in which the pin directly beneath travels with the carriage, and these rockers coinciding with the various rates or prices indicated on the rate bar 17, are bored to present sockets of as many units of depth as there are units of value on the rate bar, the effect being that when the carriage coincides with say, for instance, rate five, which, of course, means five cents per pound of the merchandise to be sold, the portion of the first rocker coinciding with this rate will have no socket in it, and consequently will not move, the corresponding portion of the second rocker will have a socket of five units of depth, and will move down until the pin engages the end of the socket and the corresponding portion of the third rocker will have no socket, and therefore will not move. Another example,—the portion of the first rocker coinciding with the rate 3½ will have no socket, the second rocker will have a socket of three units of depth and the third rocker will have a socket of one unit of depth. When the manually operated lever 50 is depressed the rockers having sockets registering with the pins will be pulled down until the pins reach the ends of the sockets and this movement will cause the print wheels to be rotated to a corresponding extent. The links 185, corresponding with the links 75, for connecting these rockers to their particular print wheel mechanisms, although longer than the links 75, perform the same function. These rate print wheels are indicated at 186, 187 and 188; the wheel 186 although divided into tenths like the other print wheels has three type only, indicating respectively— one, two and three; print wheel 187, which is similarly divided has thereon type indicating one, two, three, four, five, six, seven, eight, nine and zero, and the print wheel 188, also divided into tenths, has one type only and that representing onehalf. This latter type wheel will be a segment and in order that it may print its character in proper proximity to the unit the type is carried on a flange 189 overhanging its pinion and sector rack. This is permitted by the fact that there being one character only the wheel does not rotate but simply oscillates a distance corresponding to one unit of depth in the socket.

The weight in pounds and ounces to the capacity of the scale is indicated in a strip 190 attached to the cylinder and encircling the same; the graduations being the same as those used in the computing scales on the market.

The quantities in pounds and ounces of the merchandise being sold is computed by sockets or borings of different depths in the perimeter of the cylinder, a series of movable pins located in fixed position, a series of rockers and a series of printing mechanisms and operative connections between the manually operated lever and these rockers. These sockets and the zero surfaces are in four circumferential lines, 200, 201, 202 and 203. The ounce is the unit, and this unit of measurement is used in the division of the cylinder in the same manner as in the computing scales at present in use, the first circumferential line 200 of this series of four represents tens of pounds, the second line, 201, units of pounds, the third line, 202, tens of ounces and the fourth line, 203, units of ounces. The sockets in the tens of pounds will only appear in the axial lines where there are ten pounds or over and these sockets are of as many units of depth as the axial lines indicate pounds. The other line of this series is similarly provided with sockets, but with a scale having a capacity of sixteen pounds the sockets in the tens of pounds' line will be of a single unit of depth. The sockets in the units of pounds' line will not exceed these units of depth. The sockets in the tens of ounces will be a single unit of depth and the sockets in the units of ounces will include the range 1, 2, 3, 4, 5, 6, 7, 8, 9. The rockers for this particular mechanism are arranged in reverse of the rockers 35 and 180 and they are pivoted on a shaft 210 parallel to and in the same vertical plane as the shafts 38 and 183 and the length of these rockers from their pivots to the points in their ends in the vertical plane of the axis of the drum being equal to the rockers 35, 36 and 37, 180, 181 and 182, the degrees of movement of their free ends will be the same, all other conditions being equal. One leg, 215, only of each of these rockers is of this length, the other leg, 216, being slightly greater in length than the distance between the shaft 38 and the pivotal connection at 76 of the link 75 and the outer end of this arm has a link 217 pivotally connecting the same to the pivot pin 77 and through it to the print wheels and printing wheel controlling and limiting devices of this particular mechanism which corresponds with the mechanism described in connection with the pull-bar 69. These print wheels are indicated at 220, 221, 222 and 223, each having a pinion 224 similar to the pinion 110 secured rigidly thereto and intermeshing with a sector rack 225 (see Fig. 3) which also intermeshes with another pinion 226 secured rigidly to a spiral lock 227 controlled by the pins 228 actuated by a lever 229 fulcrumed on the shaft 81 and pivotally connected at its short end to the lower end of link 217. Each rack 225 is connected to one of the pull-bars 62, 63, 64 and 65 by a lever consisting of two parts corresponding with parts 115 and 116.

The print wheels just described are operated in exactly the same manner as the print wheel 131, the arrangement of parts being the same.

The case of this machine, in order to accommodate the mechanism of the scale, has a drum 250 containing the cylinder, and upwardly and laterally extending box-like structure, 251, in addition to the usual standard, 252, and base, 253, the drum having a single glazed aperture, 254, through which the operation of the strip 190 bearing the figures representing in pounds and ounces the weight of the merchandise may be seen resting upon the platform. The computations are printed upon a strip of paper 300 which extends between the hammer of the printing mechanism and the inking ribbon 301.

The paper feeding and cutting mechanism and the inking mechanism are not illustrated in detail as they do not form part of the present invention being commonly used in cash registers.

It is to be understood that the word "socket" hereinafter occurring in the claims covers borings or notches.

*Operation.*

I will now describe the operation of a computing platform scale with my invention applied thereto.

The merchandise being sold is thrown on the platform, the depression of which rotates the cylinder in the usual way and brings the figures indicating the weight of the merchandise in juxtaposition with the aperture 254, the entire mechanism of the scale securing this result being in common use and forming no part of this invention.

Simultaneously with the positioning and setting of the cylinder, the proper line of sockets is placed in the vertical plane of the axis of the cylinder, these sockets being of depths calculated to govern the extent to which the pins 30, 31 and 32 may be inserted into the sockets. The carriage is then shifted until the pins register with the rate at which the merchandise is sold. This will also place the pins 177, 178 and 179 in coincidence with sockets in the rockers 180, 181, and 182 which have depths calculated to govern the extent to which these rockers may be depressed. At the same time the proper sockets in the pounds and ounces series, 200, 201, 202 and 203, will be placed in this same vertical plane. Upon depressing the lever 50 the first action will be the depression of all the rockers to the extent permitted by the pins and consequently the adjustment of the various print wheels to bring the proper type into alinement. The continued depression of this lever causes the hammer to be vibrated and the total weight of the merchandise, the rate at which it is sold and the total price to be printed on a slip.

This slip of paper is usually carried in a ribbon of paper wound on drums or spools and the type is inked by the inking ribbon suitably fed and reversed and the printed slip cut off by cutting mechanism, all of which are in common use in scales, cash registers and other machines for similar purposes.

What I claim is as follows:

1. In a computing scale, the combination with the frame thereof and a weight-operated rotary member the periphery of which is provided with a plurality of sockets; of a carrying member, a series of substantially vertically disposed pins slidably mounted in said carrying member and adapted to enter said sockets, a series of nested U-form rockers overhanging said pins and constructed and arranged to cause the latter to enter the said sockets the arms of the rockers being fulcrumed in the machine frame and indicating mechanism operatively connected to the rockers.

2. In a computing scale the combination with the frame thereof and a weight-operated rotary member, the perimeter of which is provided with a plurality of sockets, of a carriage movable along the rotary member and having mounted therein a series of vertically movable pins yieldingly supported above the perimeter of the rotary member and adapted to enter the said sockets; a series of nested U-form rockers extending in length from end to end of the said rotary member and substantially in the vertical plane of the axis of the same, the arms of the said rocker being pivoted at their ends upon a shaft carried by the frame; a series of pull-bars; means operatively connecting the pull-bars to the rockers to cause operation thereof in unison; printing mechanisms; means for controlling said printing mechanisms and operated by the said pull-bars; a manually operated member; yielding means operatively connecting the manually operated member to the pull-bars; and means yieldingly operatively connecting the manually operated member to the printing mechanism.

3. In a computing scale, computing mechanism; printing mechanism including a print wheel, and a pinion movable in unison with the print wheel; means for controlling the print wheel and being operatively connected to the computing mechanism, said means consisting of a rotary spiral member, a pinion movable in unison with the said member, a sector rack intermeshing with the last-mentioned pinion and the pinion movable in unison with the print wheel, means operatively connected to the computing mechanism and constructed and arranged to limit the extent of rotation of said spiral member in proportion to the computations; and means operatively connected to the computing mechanism, controlling mechanism and printing mechanism.

4. In a computing scale, the combination with the frame thereof, a graduated rate or price member mounted upon the machine frame, a carriage movable in a direction parallel to the said rate or price member, a series of nested U-form rockers having sockets of graduated depth, the units of measurement of depth of which correspond with the rates or prices on the rate or price member, a plurality of fixed pins upon the carriage and corresponding in number to the series of sockets coinciding with each rate or price; rate or price printing mechanisms; means operatively connecting the rockers to the rate or price printing mechanism to cause the same to operate in unison.

5. In a computing scale, the combination with the frame thereof, a graduated rate or price member mounted upon the machine frame, a carriage movable in a direction parallel to the said rate or price member, a series of nested U-form rockers having sockets of graduated depth, the units of measurement of depth of which correspond with the rates or prices on the rate or price member; a plurality of fixed pins upon the carriage and corresponding in number to the series of sockets coinciding with each rate or price; rate or price printing mechanisms; means operatively connecting the rockers to the rate or price printing mechanisms to cause the same to operate in unison; a manually operated member and means operatively connecting the manually operated member to the rockers and printing mechanisms.

6. In a computing scale, the combination with the frame thereof, a graduated rate or price member mounted upon the machine frame, a carriage movable in a direction parallel to said member, a series of nested U-form rockers having sockets of graduated depth, the units of measurement of depth of which correspond with rates or prices on the rate or price member; a plurality of fixed pins upon the carriage and corresponding in number to the plurality of sockets coinciding with each rate or price; a series of pull-bars, a series of links connecting the ends of the pull-bars to the rockers; a series of print wheels carried by the frame of the machine in axial alinement; means for rotating the print wheels; a series of devices for controlling the rotation of the print wheels; a series of devices for limiting the operation of the controlling devices; means for operatively connecting these last mentioned devices to the pull-bars; a manually operated member; and means for connecting the manually operated member to the pull-bars and print wheel rotating means.

7. In a computing machine, a rocker; means automatically indicating the weight or value of a given article; means whereby the said automatic means varies the extent of movement of the rocker in proportion to the said results; a bar operatively connected to the rocker to move in unison therewith; a manually operated member operatively connected to the said bar; a print wheel; a pinion rigidly connected to the print wheel and rotatable in unison therewith; a spiral lock; a pinion rigidly connected to the spiral lock and rotatable in unison therewith; a sector rack intermeshing with both pinions; yielding means operatively connecting the manually operated member to the sector rack; an axially movable pin supported in radial relation with the axis of the spiral lock and adapted to vary the extent of rotation thereof by its movement to and from the said axis; and means operatively connecting the lever to this limiting pin.

8. In a computing machine, a rocker; means automatically indicating the weight or value of a given article; means whereby the said automatic means varies the extent of movement of the rocker in proportion to the said results; a bar operatively connected to the rocker to move in unison therewith; a print wheel; a pinion rigidly connected to the print wheel and rotatable in unison therewith; a spiral lock; a pinion rigidly connected to the spiral lock and rotatable in unison therewith; a sector rack intermeshing with both pinions; yielding means operatively connecting the bar to the sector rack consisting of a two-part lever, the parts of which are hinged together with a hinge-pin journaled in the frame of the machine; a pair of fingers carried by the parts of the lever and a retractile spring connected between said fingers; an axially movable pin supported in radial relation with the axis of the spiral lock and adapted to vary the extent of rotation thereof by its movement to or from the said axis; and means operatively connecting the bar to this limiting pin.

9. In a computing machine, a rotary cylindrical computing member having an even surface with a plurality of drilled openings therein, pins adapted to enter said openings, the bottoms of said openings adapted to limit the movement of the pins, and the sides of the openings constituting guides for the pins during their movement therein, and recording mechanism operatively connected to said pins.

10. In a machine of the type described, a computing member, guiding means located adjacent the perimeter of said member, pins movable to and from said member and extending slidably through said guiding means, rocker devices in operative relation with said pins, collars on said pins and springs encircling the pins and bearing between said collars and guiding means.

11. In a computing machine, a rotary computing member, a carriage movable in a direction parallel to the axis of the member and having a pair of flanges formed integrally therewith, a plurality of pins slidably mounted in said flanges and adapted to be moved to and from engagement with the said member, and a series of rocking devices extending from end to end of the computing member and adapted to engage the adjacent ends of the pins for the purpose of moving the same into engagement with the computing member.

12. In a computing machine, a rotary computing member, a carriage located in close proximity to the computing member, pins slidably mounted on the carriage and having their lower portions substantially located in the vertical axial plane of the computing member, a series of rockers constructed and arranged to engage the upper ends of the said pins for the purpose of moving the latter into engagement with the computing member, one of such rockers being substantially disposed in the vertical axial plane of the computing member and the other rockers on opposite sides thereof, the pins engaged by such other rockers being offset.

13. In a computing machine, a computing member, a carriage located in close proximity to the periphery of said member and movable in a direction parallel to the axis of the latter, said carriage consisting of a unitary member having laterally projecting flanges, pins vertically and slidably mounted in said flanges, and means for moving the pins into engagement with said computing member.

14. In a computing machine, the combination with the machine frame, a rotary computing member and a series of computing rockers, of a carriage slidably mounted on the machine frame between the said member and rockers, said carriage consisting of a unitary member having laterally projecting flanges, a series of pins rigidly carried by one of said flanges and constructed and arranged to be engaged by the computing rockers, a second series of pins slidably carried by the other flanges and constructed and arranged to be moved into engagement with the rotary computing member, and means for actuating said second series of pins.

15. In a computing scale, computing mechanism including a movable member, means for indicating the results of the computations, means for controlling the extent of movement of the said indicating means, consisting of a rotary spiral member having its periphery divided to present a plurality of stops and a device movable to and from engagement with the periphery of said spiral member and constructed and arranged to limit rotation of the member, said device being operatively connected to the computing member and having an extent of movement determined by said member.

16. In a computing scale the combination of the frame thereof and rotary means having a plurality of graduated controlling sockets; of a bracket rigidly mounted on the frame of the machine; a series of pins supported by the bracket and adapted to be moved into engagement with the sockets; means yieldingly supporting the pins out of engagement with the sockets; a series of rockers pivoted to the frame of the machine and having one end of each in operative engagement with one of the said pins; mechanisms for indicating the results of the computations obtained by the engagement of the pins with the sockets; and means whereby these result-indicating mechanisms are operatively connected to the other end of each of said rockers.

17. In a computing scale the combination with the frame thereof, a graduated rate or price member mounted thereon, and weight operated rotary computing member the periphery of which is provided with a plurality of sockets the units of measurement of depth of which correspond with the rates or prices on the rate of price member, a series of nested U-form rockers fulcrumed in the machine frame and movable to and from said computing member, pins actuated by said rockers and constructed and arranged to be moved to and from said computing member, a series of pull-bars, a series of links connecting the ends of the pull-bars to the rockers, a series of print wheels carried by the frame of the machine in axial alinement, means for rotating the print wheels, a series of devices for controlling the rotation of the print wheels, a series of devices for limiting the controlling devices, means for operatively connecting these last-mentioned devices to the pull-bars; and means for actuating said pull-bars.

In testimony whereof I have signed my name to this specification in the presence of two witnesses.

GEORGE R. WOOD.

Witnesses:
 WILLIAM HEWETSON,
 GORDON G. COOKE.